March 10, 1931. A. H. LEIPERT 1,795,432
CUSHION CONNECTION FOR VEHICLE CONSTRUCTION
Filed March 20, 1924 2 Sheets-Sheet 1
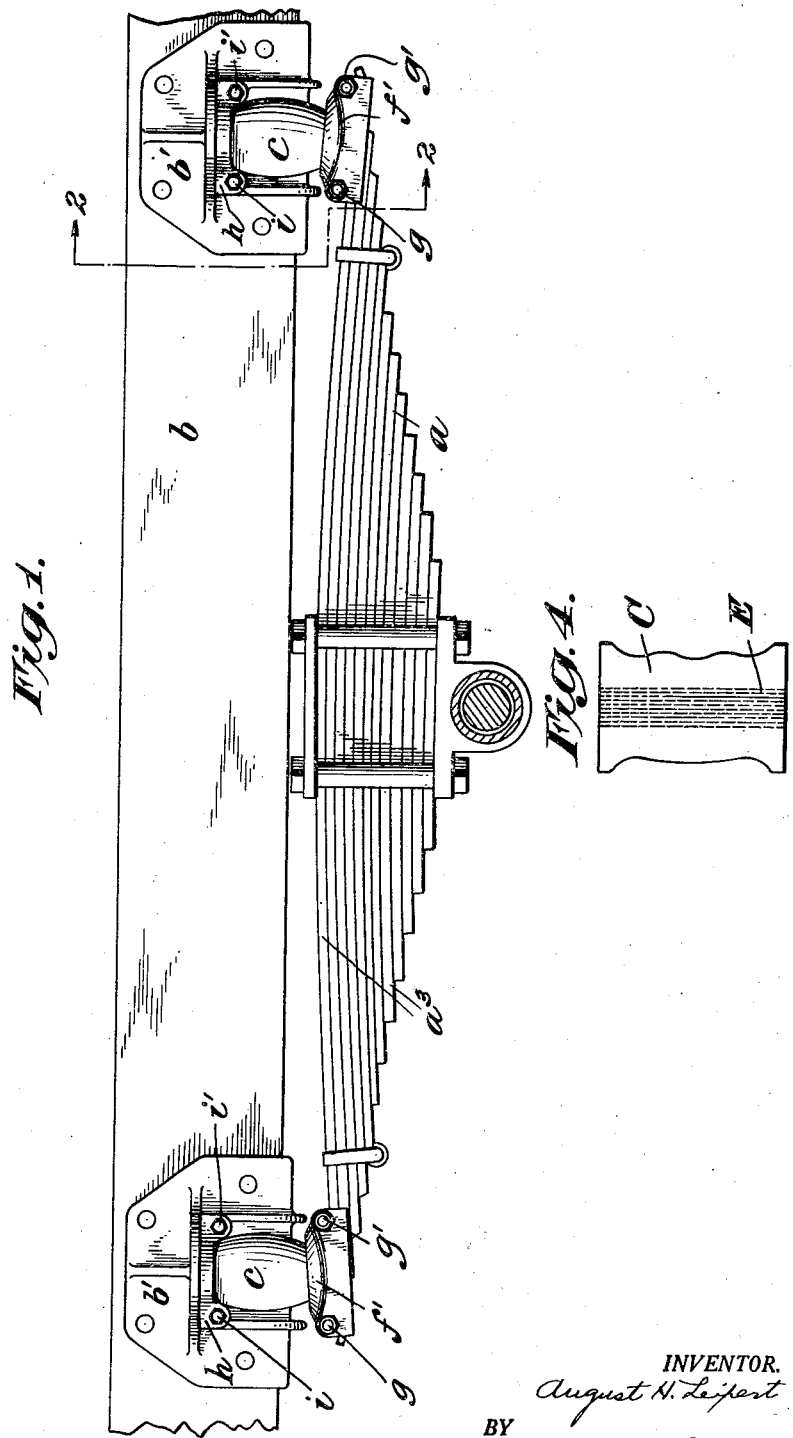

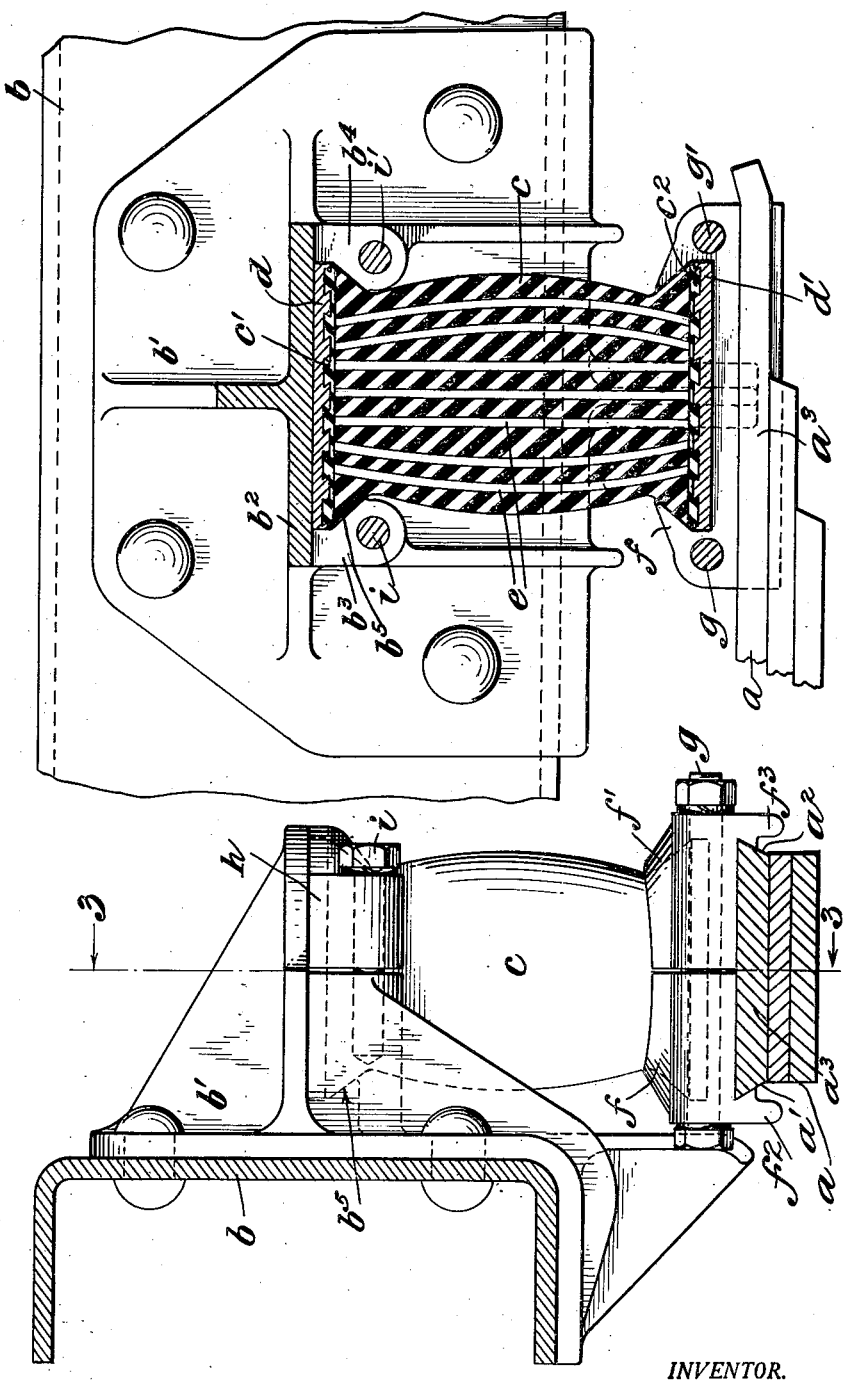

Patented Mar. 10, 1931

1,795,432

UNITED STATES PATENT OFFICE

AUGUST H. LEIPERT, OF NEW YORK, N. Y., ASSIGNOR TO INTERNATIONAL MOTOR COMPANY, OF NEW YORK, N. Y., A CORPORATION OF DELAWARE

CUSHION CONNECTION FOR VEHICLE CONSTRUCTION

Application filed March 20, 1924. Serial No. 700,531.

This invention relates to cushion connections for interposition between two metallic parts of a motor vehicle as, for instance, between the end of a spring and the frame. Since it is probable that the construction will find its most ready application as a spring shackle it will be so described herein although it is to be understood that it may be designed for use by one skilled in the art in other situations. The principal object of the invention is to provide such a non-metallic connection which shall be of resilient nature rather than non-resilient as is the case with some other types of non-metallic connectors intended for similar use and yet be of such nature as will permit it to be securely connected to the metal parts between which it is interposed and function under tension as well as under compression. More particularly, the invention has for its object to provide a connection of rubber which may be employed essentially as a link between two metal parts. In accordance with the invention provision is made for securing unvulcanized rubber to the metal parts by mechanical means which are durable and dependable and facilitate ready assembling and disassembling. As a shackle, the rubber may be moulded in somewhat elongated form and of any desired cross section and its ends vulcanized to hard rubber or steel flanges or a combination of the two at the top and bottom. These flanges constitute the anchoring means for the link and to this end its body may be so moulded as to facilitate engagement of mechanical clamping devices therewith. A further object of the invention is to provide such a link connection which shall function to equal advantage under compression and tension and which may have incorporated therein cords by way of reenforcement.

The invention will be described more particularly in connection with the illustrated embodiment shown in the drawings, in which:

Figure 1 is a fragmentary view in side elevation showing the application of the improved connection as a shackle between the end of the vehicle spring and the frame.

Figure 2 is a view in section on a larger scale through the vehicle frame and spring and taken on the plane indicated by the line 2—2 of Figure 1 and looking in the direction of the arrows.

Figure 3 is a vertical sectional view through the shackle taken on the plane indicated by the line 3—3 of Figure 2 and looking in the direction of the arrows.

Figure 4 is a view in elevation of a modified form of the improved device showing the cords at the center.

As indicated hereinbefore, the improved cushion connection is illustrated herein by way of example as applied between the ends of a vehicle spring and the frame. Other applications will suggest themselves to one skilled in the art. As shown in Figure 1 the vehicle spring $a$ is connected to the frame $b$ by means of the improved connection $c$ one of which is secured at each end of the spring. Any desired mechanical securing devices may be employed for attaching the link to the spring and to the frame. Those shown herein are designed with reference to accessibility, dependability and ease of application and disassembling. The important feature of the invention resides in providing a block of unvulcanized rubber which has all of the desirabilities required as a yielding non-metallic element and yet which is secured fixedly to the two metallic parts to be connected and holds them together both under compression and tension strains. The improved result is attained by providing at each end of the mass of rubber $c$ hard rubber or metal flanges or a combination of the two. For instance, as shown in Figure 3, the link $c$ has at top and bottom hard rubber flanges $c'$, $c^2$, respectively, which are vulcanized thereto and these hard rubber flanges are in turn secured fixedly to metal plates $d$, $d'$, respectively, the union being facilitated by undercut grooves in the metal plates into which the rubber is directly vulcanized.

In assembling the parts it is proposed that the load of the vehicle transmitted from the frame $b$ will rest on the blocks $c$ which in turn are carried on the spring $a$. This means, of course, that the blocks are subject to compression under the vehicle load but since the connections act as shackles they must resist tension stresses tending to separate the frame $b$ from the spring $a$. To stiffen the block, in order that it may better resist both lateral strains and compression and tension stresses, fabric cords $e$ may be moulded therein and extend longitudinally thereof.

In the embodiment of the block C, shown in Figure 4, the cords E are shown as moulded in close juxtaposition near the vertical axis of the block so that they are mutually re-enforcing and provide a relatively stiff structure which will effectively oppose sidesway and also longitudinal stresses.

The specific means illustrated for securing the block to the frame and to the spring will now be described. As shown, the link is moulded with bulging walls adjacent to its top and bottom flanges $c'$, $c^2$, and advantage is taken of this peculiar shape to provide co-operating clamping elements $f$, $f'$, at the bottom which are flanged to overlie the enlarged section and clinch it so that the block is held against withdrawal. Through bolts $g$, $g'$, afford a ready and convenient means for applying the clamping pieces $f$, $f'$, to the block in the manner described. The clamps $f$, $f'$, may be formed on their lower surface with undercut flanges $f^2$, $f^3$, respectively, which engage reversely beveled edges $a'$, $a^2$, of one or more spring leaves $a^3$. Accordingly, when the bolts $g$, $g'$, are tightened up the clamping pieces $f$, $f'$, are drawn simultaneously into clamping engagement with both the spring $a$ and the block $c$, as is desirable. The top of the block may be fastened to a bracket $b'$ secured to the frame $b$. This bracket may be flanged as at $b^2$ to provide a seat for the top plate $d$ of the link and further flanged as at $b^3$, $b^4$, to form with the plate $b^2$ a recess in which the block may be readily positioned. An undercut flange $b^5$ is indicated in dotted lines in Figure 2 at the bottom of the recess formed in the manner described to engage the material of the block where inclined, in the manner heretofore described with reference to the lower clamping pieces $f$, $f'$. A complementary retaining piece $h$ is adapted to be bolted into engagement with the exposed edge of the block by means of bolts $i$, $i'$, which may enter the side flanges $b^3$, $b^4$, on the bracket $b'$. The clamping piece $h$ may be undercut for co-operative engagement with the bulging wall of the block in the manner heretofore described. The securing devices illustrated are at once simple and effective and are readily applied to and removed from the shackle link, the undercut ways serving, of course, to hold the block effectively against longitudinal stresses.

When the parts are assembled the load of the vehicle is on the link thereby placing the resilient material under compression. Lateral stresses are resisted by the link effectively, the cords, perhaps, contributing thereto. Vertical movements of the spring with respect to the frame are resisted effectively by the improved shackle, the rubber acting resiliently. The means described for fastening the rubber to the metal parts through the vulcanized end flanges insure durability in the entire structure and dependable engagement with the metal parts.

Changes within the latitudes indicated may be made by one skilled in the art without departing from the spirit of the invention.

What I claim is:

1. A non-metallic resilient connection between two metallic parts of a motor vehicle comprising a link having a solid live rubber section and non-resilient securing devices vulcanized thereto, and means including inter-engaging dove-tailed keyways to secure said non-resilient devices to the metal parts to be connected.

2. In combination with the spring and frame of a motor vehicle, a spring shackle comprising a link having a solid resilient rubber section therein, non-resilient securing devices vulcanized to the rubber section, and means including inter-engaging dove-tailed keyways to secure said non-resilient devices to the frame and spring, respectively.

3. In combination with the spring and frame of a motor vehicle, a spring shackle comprising a link having a resilient rubber section therein, non-resilient securing devices vulcanized to the rubber section, the securing devices and the frame and spring having interengaging dove-tailed keyways, said link being formed with enlarged ends and undercut clamping means carried with the frame and spring, respectively, and engageable with said enlarged ends to secure the link to the frame and spring.

This specification signed this 14 day of March, A. D. 1924.

AUGUST H. LEIPERT.